United States Patent
Hawkes

(12) United States Patent     (10) Patent No.:    US 6,182,699 B1
(45) Date of Patent:    Feb. 6, 2001

(54) DIVERTER VALVE FOR IMPROVED FLOW CONTROL

(76) Inventor: David R. Hawkes, 820 Cerissa St., San Diego, CA (US) 92154

(*) Notice: Under 35 U.S.C. 154(b), the term of this patent shall be extended for 0 days.

(21) Appl. No.: 09/164,988

(22) Filed: Sep. 30, 1998

Related U.S. Application Data

(63) Continuation-in-part of application No. 08/799,444, filed on Feb. 13, 1997.

(51) Int. Cl.[7] .................................................. F16K 1/00
(52) U.S. Cl. ..................... 137/875; 137/872; 137/861
(58) Field of Search ............................ 137/875, 872, 137/861, 862, 868, 871

(56) References Cited

U.S. PATENT DOCUMENTS

| | | | |
|---|---|---|---|
| 4,122,612 | * 10/1978 | Mrofchak | 137/875 |
| 4,718,457 | * 1/1988 | Luger | 137/875 |
| 5,265,547 | * 11/1993 | Daws | 137/875 |

* cited by examiner

*Primary Examiner*—David J. Walczak
(74) *Attorney, Agent, or Firm*—Donn K. Harms

(57) ABSTRACT

A control valve for controlling the fluid flow of particulate and other materials through a conduit having a housing accepting the fluid flow received from an inlet conduit. A selectively positionable elliptical shaped diverter plate is positioned in a central chamber formed between two outlet conduits for diverting the fluid flow into one or both two outlet conduits as needed. The diverter plate is dimensioned substantially the same as the configuration as the input ends of both of said outlet conduits and the center chamber. The walls of the input ends of the outlet conduits taper inwardly in the direction of the outlet end decreasing in size allowing the diverter plate to seat against in walls and seal or divert fluid flow from one or the other outlet conduits without the need for a stop or seal. The diverter plate is replaceable through an access slot in the body of the valve by either replacing the plate into an axle slot in a permanently mounted axle, or by replacement and axle and plate assembly mounted on bearings.

9 Claims, 4 Drawing Sheets

DIVERTER VALVE FOR IMPROVED FLOW CONTROL

The application is a continuing in part application from application Ser. No. 08/799,444 field Feb. 13, 1997.

BACKGROUND OF THE INVENTION

1. Field of the Invention

The present invention relates to a valve. More particularly to the art of flow control diverter valves used to divert or mix bulk and particulate material fluids flowing through a conduit.

2. Prior Art

Batch processing and mixing of powdered and bulk solid ingredients in manufacturing plants conventionally involve the flow of such materials through a conduit system for mixing, drying, and final discharge for packaging. The mixing of the different granular and powdered bulk materials to achieve the desired end product involves a number of steps.

Generally, to achieve the desired mix and consistency of the end product to be shipped requires mixing numerous ingredients of varying consistency from fine powder to large granules. Mixing of such materials is generally required to achieve desired end products such as foodstuffs, animal feeds, food additives, cement, grains, fertilizers and many other products using multiple ingredients needing mixing to achieve the resulting desired end product.

Conduit systems using compressed air and gravity feed are conventionally used to create a flow of raw materials through a system. The flow of materials is diverted at differing points to be dried, ground, humidified, and mixed with other raw materials also flowing through the conduit system. The primary conventional manner in which the materials flowing through the conduit system are mixed and routed to be processed to be finished product is by the use of diverter valve assemblies having diverter valve blades therein.

Conventional diverter valve assemblies widely used in the bulk engineering industry generally are in an inverted "Y" configuration. One round conduit forms the inlet leg the top of the inverted "Y" shaped valve assembly and feeds the material flow into a center chamber. Two round outlet conduits form the exit legs of the inverted "Y" shaped valve assembly and also converge into the rectangular or box shaped center chamber in a sealed relationship.

Inside the box shaped center chamber a rectangular diverter blade of metal or rubber is situated. This diverter blade is actuated by connection to a conventional external switching apparatus and is used to actuate the valve blade and divert the flow of material entering the box shaped chamber from the inlet leg to one of the two exit legs while concurrently sealing the flow from entering the other exit leg connected to the box shaped center chamber.

The valve blade in conventional systems is rectangular shaped to cooperate with the inside walls of the box shaped center chamber in a sealing relationship when activated to divert the material flow. Generally a replaceable seal is required about the perimeter of the rectangular valve blade to insure a good seal with the inside walls of the box shaped center chamber. Depending on the construction of the center chamber, stops positioned about the inside wall of the center chamber may also be used to aid in locating the valve blade in the correct diverting position and to aid the valve blade in maintaining that position when subjected to heavy pressure by the flowing material inside the conduits and box chamber. A number of continual problems however exist with this configuration of a diverter valve assembly.

First, the flat walls of the box like rectangular center chamber, unlike the circular walls of the communicating conduits, are easily dented. Consequently, the valve blade must be maintained in a loose sealing relationship with the inside walls of the box shaped center chamber. This is because an inwardly dented wall in the center chamber will jam the valve blade from correctly rotating to the required positions to accurately divert material flowing through the chamber. As such, conventional diverter valve blades are formed in a loose relationship with the inside walls of the center chamber of the diversion valve assembly and a rubber seal is affixed to the perimeter of the valve blade to maintain a reasonable seal. This seal is in need of constant inspection and replacement to insure that leaks do not develop in the seal which would allow improper mixtures to occur from bypassing material through the leaks.

Additionally, the loose working relationship with the diverter valve blade and interior walls of the box shaped center chamber can also require the need for stops to be placed in the center chamber to insure the diverter valve will not over rotate under pressure from the bulk material flowing in the conduit and break or allow the flow to reach the exit conduit intended to be sealed. Such stops however can cause flow interruptions in the exit conduit not blocked or if the stops are inserted through the side walls of the box shaped center chamber when needed and removed when not needed, holes in the side wall to accommodate the selectively insertable stops can cause leakage and flow problems.

As is obvious, leaks of material into the wrong or blocked exit conduit can cause serious problems with the end product and can result in the need to destroy the end product is contaminated by leaking material flow. Additionally, the constant need to inspect and change seals, and the constant danger of the flat sides of the box shaped center chamber being dented and jamming the valve blade cause increased production and maintenance costs.

A further problem encountered with conventional diverter valve assemblies is that of occupied space. Generally, the fluidized conduits entering and leaving the box like center chamber when added to the required area for the chamber itself, takes up extra space in the linear conduit system due to the need for adapters to take the conduit from round to square and back to round. In many factories and offices built in years past, such diverter valve assemblies have been place in hard to reach areas in between floors and replacement of worn valve assemblies is a vexing problem the physical size does not accommodate easy removal and replacement in tight quarters. It is an all to common requirement to remove sections of the floor of manufacturing plants replacing such valve assemblies in order to achieve sufficient space to remove the old valve assembly and insert a replacement.

U.S. Pat. No. 5,244,014 (Lie) teaches a round Y shaped multiway valve assembly however it is constructed of multiple pieces which would be expensive to manufacture and it requires stops for the diverter blade. Further, because of the differing dimensions in different plants using a fluid conduit system to process materials Lie's tight manufacturing tolerances and resulting method of manufacture would preclude making small batches or custom sized valves due to economics.

As such, there exists a need for an easily and inexpensively manufactured apparatus, which can be easily customized for size requirements of differing bulk processing batch processing systems which use a particulate fluid flow through a conduit system to mix and process the solids flowing therethrough or for air conditioning and heating systems for diverting air flow. An additional need exists for such a device that needs little or no adjustments to accomplish this task. A further requirement needed for such a device is not easily damaged about its exterior body and which does not require stops or locators to position the diverter valve blade in a sealing relationship with the intended outlet to be sealed. Finally, such a device should have the additional benefit of occupying less area than conventionally used diverter valve assemblies allowing for the easy retrofit and replacement of conventional diverter valves in tight area constraints.

SUMMARY OF THE INVENTION

Applicants' device is an easily manufactured and operated diverter valve apparatus allowing for the diversion of particulate fluid streams during batch processing and mixing of powdered and bulk solid ingredients in manufacturing plants using conventional conduit systems for mixing being processed through a conduit system.

The Applicant's diverter valve assembly operates in an inverted "Y" configuration used in systems for batch processing and materials mixing process. In the conventional process of material the fluid stream would flow into the device through a substantially round conduit used in most such processing plants. The fluid flow would enter into the inlet leg of applicant's inverted "Y" shaped diverter valve assembly. The inlet leg is round at the flow entry and communicates with a central chamber of the diverter valve allowing entry therein of the fluid flow of powder or other solid fluid materials being mixed and/or processed to a desired finished product.

Two outlet legs of the improved diverter valve are connected to the central chamber in a sealed relationship for fluid flow therethrough. The two outlet legs are substantially round at their discharge or distal ends where fluid material selectively allowed to pass through either of the two outlet legs feeds back into the processing system. This allows for easy attachment to conventional processing systems.

A diverter valve blade shaped to cooperate with the walls of the valve body housing at a sealing point substantially located at the intersection of each of the two outlet legs is situated inside of the central chamber. The diverter valve is selectively rotatable about an axle which is located substantially at the middle of a center chamber area on the wall of the valve housing opposite to the inlet leg. The diverter valve blade is selectively actuated by connection to a conventional external switching apparatus and is used to rotate the valve blade and divert or divide the fluid flow of material entering the central chamber from the inlet leg to one of or both of two exit legs while concurrently sealing the flow from entering the other exit leg connected to the central chamber area.

The walls of the exit legs at their junction to the central chamber are shaped such that they form an elliptical shape about the internal chamber of the housing substantially where it meets with the exit leg wall. The diverter valve blade in the current preferred embodiment is a continual ellipse shape to cooperate with the inside of the cooperating elliptical shaped walls of the center chamber at the input point with the outlet legs in a sealing relationship. When selectively activated by rotation of the attached axle the diverter blade will divert or divide the fluid flow to one or both of the outlet legs depending upon the need of the user.

If a diversion is needed to provide flow to both outlets, the diverter blade would be situated about the center of the chamber substantially parallel with the inlet leg. If a total diversion of flow to one of the outlet legs is desirable for a certain application, the diverter blade would be rotated to a sealing relationship blocking flow to the outlet leg desired.

The outside perimeter of the diverter valve blade, being shaped to cooperate with the similarly configured inside tapered walls of the input end of both legs, in a sealing relationship, requires no seal for most conventional particulate fluid flowing materials or applications such as air-conditioning conduit or heating conduit. Additionally, no stops are needed to retain the valve plate from over rotation. The interior walls of the outlet legs at a point substantially at their junction with the center chamber area of the valve housing, taper inwardly toward the outlet end of the legs, to a smaller diameter of the elliptical shape of the diverter blade. As such, the particulate or other fluid material forced against the diverter valve blade pushes the valve blade into a sealing relationship with the cooperating shaped internally tapering walls of the outlet legs.

Because the base of the elliptical shaped diverter valve may be of a length greater than the diameter of the inlet or outlet legs at their juncture to the system, the blade of the valve is inserted into the center chamber through a slot in the activating axle which communicates with the exterior of the apparatus and the central chamber when lined up with a slot in the back of the central chamber area of the housing. When rotated to the proper position, the axle communicates with the outside of the control valve and the interior thereof for insertion of the blade. Set screws may be used to removably mount the blade in place.

Further, because the elliptical shaped diverter shaped valve apparatus as whole can be shorter in a total dimension at its height from its base than conventional rectangular shaped valve blades, greater diversity in outflow angles is available. This is especially important in tight constraints and retrofitting old particulate and heating and air-conditioning fluid flow systems.

The walls of the center chamber section of the diverter valve housing increase in diameter in a shape substantially the same as the shape of the outside diverter blade to allow greater clearance for the valve blade during the rotation from the sealing relationship or seat on one outlet leg to the sealing seat of the other outlet leg. It is especially important that the base of the valve blade where it attaches to the axle be of a dimension greater than the diameter of the round portion of the inlet and outlet legs. This allows for a free swing of the blade about its axis and a dimension in the center area to aid in free flow of the fluid stream therethrough. The increased strength of the round or ellipse shape chamber combined with the ability to impart more clearance between the diverter blade and the inside walls of the center chamber using the aforementioned tapering, prevents sticking of the diverter valve blade caused by small dents which might occur in the wall of the central chamber as commonly occurs in conventional flat walled square bladed systems now in use.

For especially fine materials, or air flowing in the fluid stream requiring it, an optional seat may be placed on the perimeter edge of the ellipse or other circular shape of the diverter valve blade to provide an especially tight seal. Again, since the chamber tapers to a larger size toward the middle or axis point of the axle mount for the diverter plate, in substantially the same configuration of the outside diameter of the diverter blade, easy rotation about the axis is provided while allowing a tight seal when material exerts pressure upon the valve blade into the tapered seat area of the housing.

An object of this invention is providing an easily used and maintained apparatus for the diversion or division of particulate fluid flow systems used in a batch processing and mixing of powdered and bulk solid ingredients.

Another object of this invention is to provide a diverter valve assembly which elliptical or semi circular tapering interior walls allowing easy rotation about an axis at the larger center chamber area of the housing while concurrently allowing for especially tight seals when the valve blade rotates to seat into the tapering seat area at either of the exit leg inlets.

A further object of this invention is to provide a diverter valve assembly with circular or a semi circular shaped exterior walls which are not as easily dented or damaged as conventional used flat walled diverter valves.

An Additional object of the invention is to provide a diverter valve which does not require any mechanical stops for positioning the diverter blade and actually seals better without such stops under increasing fluid pressures.

A further object of this invention is to allow for greater flow angles in a flow diverting valve assembly.

A further additional object of this invention is to provide a diverter valve assembly which can be used with conventional round circuit and pipe fluid flow systems without the need for adapters which are required with ocnvnetional rectangular diverter valve assemblies.

Further objects of the invention will be brought out in the following part of the specification, wherein detailed description is for the purpose of fully disclosing the invention without placing limitations thereon.

BRIEF DESCRIPTION OF DRAWING FIGURES

DETAILED DESCRIPTION OF THE PREFERRED EMBODIMENTS OF THE INVENTION

Figure 1:
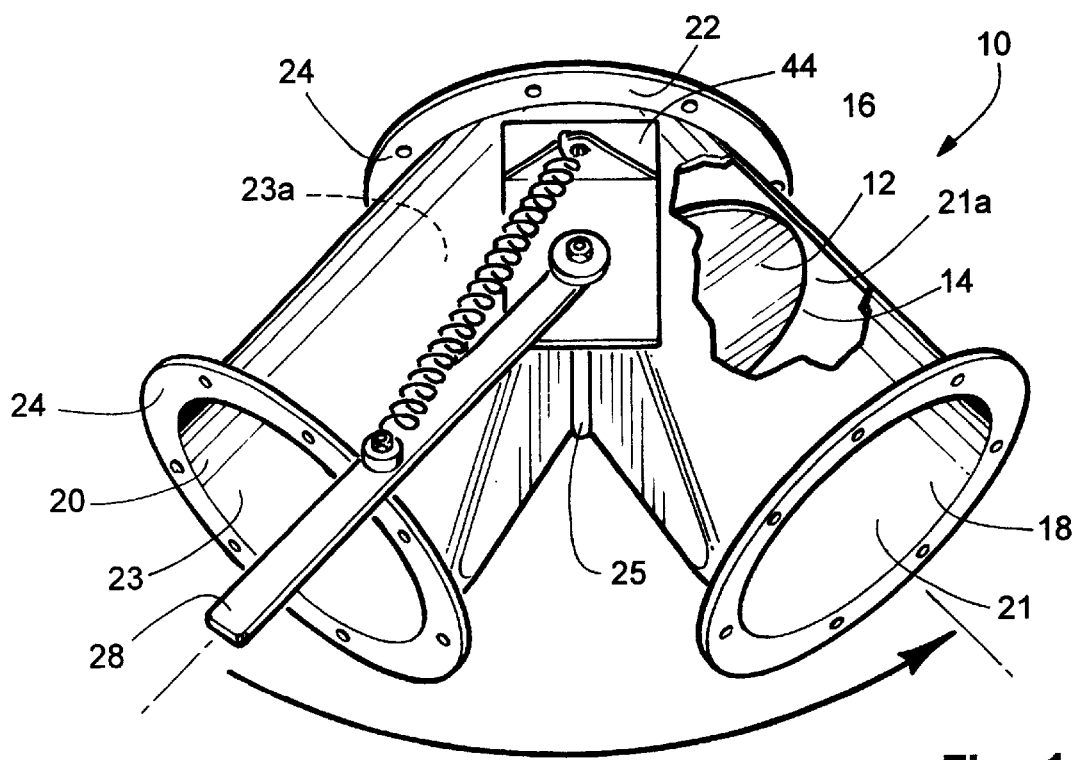
FIG. 1 is a view of the diverter valve showing the diverter valve blade in opposing sealing positions against the cooperating shaped inwardly tapering walls inside the central chamber and communicating outlet legs. A selectively rotatable axle is attached to a biased activation arm.

Referring now to the drawing Figures, specifically FIG. 1 depicts a preferred embodiment of the diverter valve assembly apparatus 10 showing the diverter valve blade 12 in opposing sealing positions against the cooperating inwardly tapering walls 14 inside the central chamber 16 which is formed by the intersection of inlet leg 22 and a first communicating outlet leg 18 and a second communicating outlet leg 20. The outlet legs 18 and 20 are round at their connecting or distal ends 21 and 23 as is inlet leg 22, and all have some mating mounting assembly 24 or other mounting configuration as needed to mount the apparatus 10 in a sealed relationship with the particular particulate or air fluid flow installation intended. While shown as round, which is the currently most widely used shape of conduits in systems, the distal ends 21 and 23 and inlet 22, need not necessarily be round in shape but more important they can be constructed to match the existing inlet and outlet conduits of the system in which the device is to be placed to divert fluid flow.

The distal end of the outlet legs 18 and 20 have a smaller diameter at their openings than the straight base edge 13 of elliptical shaped diverter plate 12. The interior dimensions of the outlet legs 18 and 20 taper to the large diameter of the base edge 13 and thus making the area of the inside diameter of the outlet legs 18 and 20 at their respective contact point with the diverter plate 12, larger than the area of the inlet leg 22, which improves fluid flow therethrough. All the legs may be extended in length to attach to the cooperating attachment points in the fluid system or adapters or spacers as need may be inserted between the leg ends and the system.

At the point where the inlet portion of outlet legs 18 and 20 communicate with the inlet leg 22 of the valve assembly 10 a central chamber 16 is formed where incoming fluid flow may be diverted or divided to one or the other or both of the two outlet legs 18 and 20. As noted above, the outlet legs 18 & 20 taper outwardly from their round shape at the distal ends 21 & 23, to form an elliptical shape at the edge of their communication with the central chamber 16 at the inlet ends 21a and 23a respectively. These inlet ends 21a and 23a of outlet legs 18 and 20 respectively are elliptical in shape to match the elliptical shape of the diverter blade 12 at their intersection with the center chamber 16 which is formed and defined by the communication of the inlet leg 22, outlet leg 18, and outlet leg 20 at a point adjacent to slot 25 which can best be defined as the inlet ends 21a and 23a of outlet legs 18 and 20 respectively. This elliptical shape formed at inlet ends of the outlet legs 18 & 20 is such that the interior wall of the valve assembly parallels the shape of the outside elliptical edge of the diverter blade 12 and at their communication point with the central chamber 16. The interior wall of both inlet ends tapers inward at a substantially constant angle toward distal ends 21 and 23 such that the selectively engageable diverter blade 12 when shaped to cooperate with the shape of the inward taper of the walls of the outlet legs, seats upon either of the inwardly tapering walls 14 in a sealing relationship. Since the interior walls are substantially equal in shape to the elliptical perimeter of the diverter blade 12 and then taper inwardly toward the distal or outlet ends 21 and 23 of the legs to form a sealing point, the more pressure applied to the diverter blade 12 from the fluid flow entering through the inlet leg 22 the better the seal over the outlet leg 18 or 20 which has been selected for cessation of fluid flow. No mechanical stops are required to maintain the diverter blade 12 from over rotation as are regularly required when using conventional rectangular shaped valves. Additionally, while an optional seal 31 can be applied to the perimeter of the elliptical portion of the diverter blade 12 for very fine powders, heaters and air-conditioning and such, it is generally no necessary to do so.

The walls of the central chamber 16 taper slightly outward from the diverter blade 12 in a shape substantially the same and slightly larger to the outer edge of the diverter blade 12 such that extra clearance is provided when the diverter blade 12 is selectively rotated to a sealing position at the inlet ends 21a and 23a of the two outlet legs 18 and 20. This ability to provide extra clearance keeps the diverter blade 12 from sticking if the sidewalls are somehow dented despite their greater wall strength than a conventional flat wall. A selectively rotatable axle 26 is attached to an activation arm 28 which is selectively biased in the desired position by a biasing means such as a spring 27 or some other device such as a conventional air ram or hydraulic cylinder (not shown). Bearings 39 may also be mounted on the device to hold axle 26.

Pressure from the fluid flow of air or particulate through the device will maintain the diverter blade 12 in a sealing relationship in the inlet ends of either of the outlet legs 18 and 20 due to the inwardly tapering size at the inlet ends of each of the outlet legs 18 and 20. Or optionally, an over centering biasing means such as a spring attached to activation arm 28 may be used to hold the blade 12 in place. Since the cross sectioned shape of the inlet ends of the outlet legs is of substantially the same configuration as that of the diverter blade 12 but slightly larger and in parallel, the diverter blade 12 swings freely. Once rotated to a position into the inlet end of the outlet leg where the diverter blade 12 reaches a point at which the inwardly tapering walls of the inlet end of the legs contact the outside edges of the diverter blade 12 a seal is formed by the outside edge of the diverter blade 12 and the inside wall of the inlet portion of the outlet leg, and the base of the blade 12 mounted in the axle 26.

Figure 2:
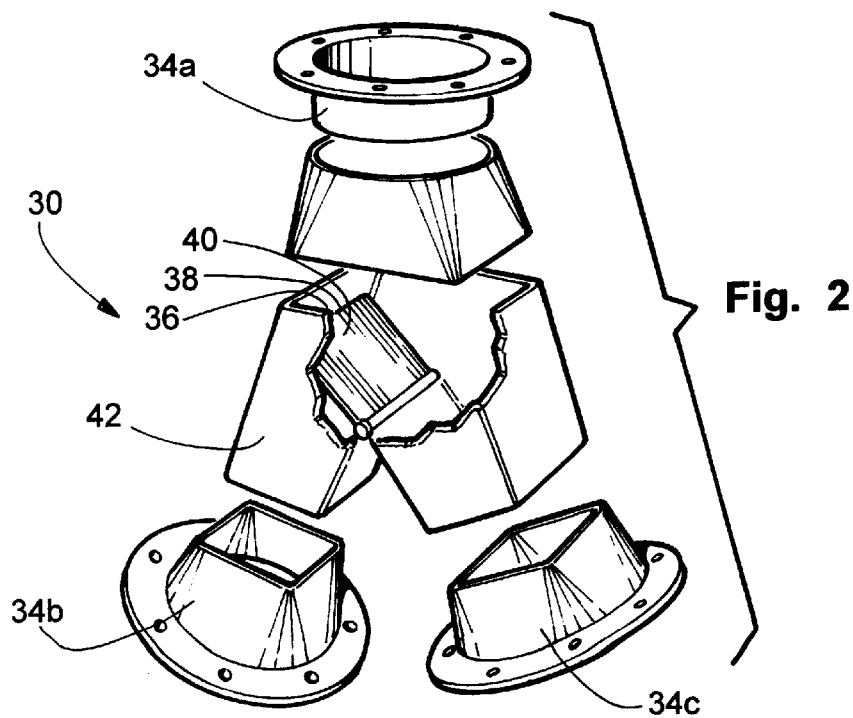
FIG. 2 is a prior art view of conventionally used diverter valves and the rectangular box like central chamber requiring adapters and greater flow angles for the assembly.

FIG. 2 is a view depicting prior art showing the conventionally used diverter valve as depicted in FIG. 2 with the rectangular box-like central chamber 32 requiring various adapters 34a, 34b, and 34c, for attachment to the normally round conduit of the rest of the conduit system and greater flow angles to achieve desired flow characteristics. Stops 36 and seals 38 are required to maintain the seal and stop the rectangular sealing blade 40 from over rotation and failure of the seal when fluid flow pressure increases upon the conventional rectangular blade 40. The sidewalls 42 of the conventional valve assembly 30 being flat, dent easily and can impede the rotation of the rectangular diverter or sealing blade 40 unless a large clearance from the interior walls is allowed. In such conventional arrangements a seal is required due to the wide clearance is subject to constant abrasion from the solids in the fluid flow and must be changed and repaired often.

Such problems of conventional art are solved by Applicant's novel rounded valve body walls and inwardly tapering leg inlet walls substantially parallel to the round or elliptical cooperatively shaped outer surface of the disclosed elliptical diverter blade 12 thus achieving a tight seal without the need for nay seal or gasket on the diverter blade 12. Further, the outward taper on the central chamber walls without the axle 26 of the diverter blade 12 allows for a free rotational movement of the valve diverter blade 12 when selectively rotated from the inlet end of one outlet leg to the other.

Figure 3:
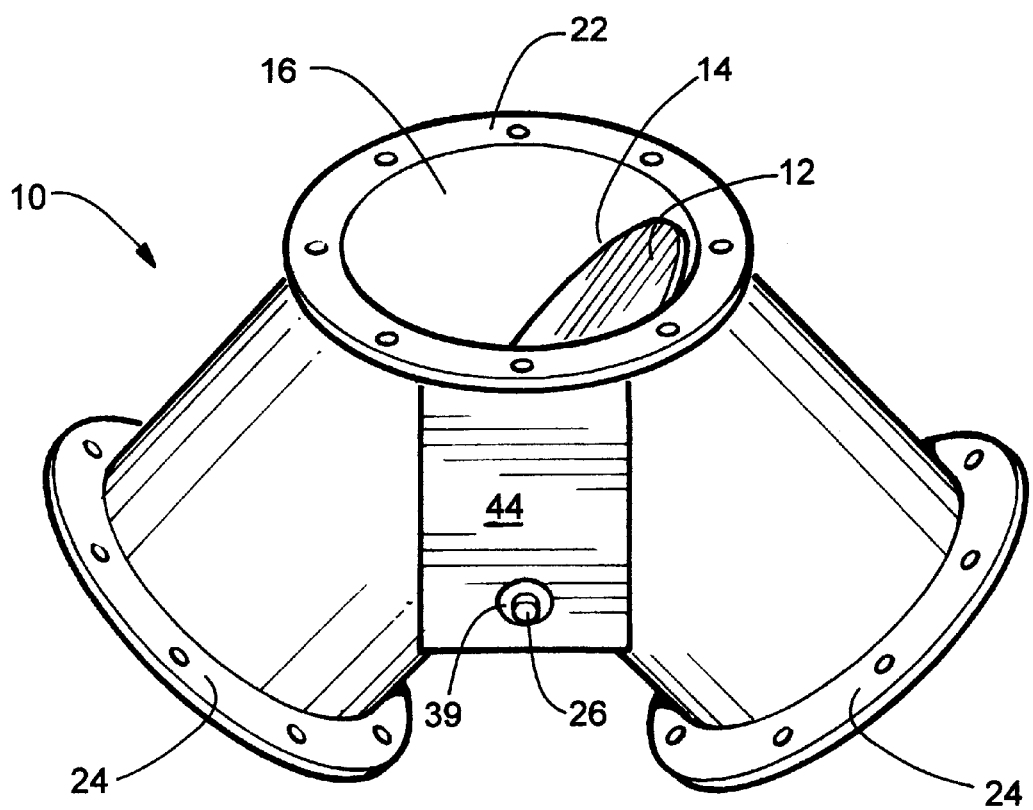
FIG. 3 is a view of the applicants diverter valve apparatus from the inlet or entry leg end showing the diverter blade in a sealing position in the tapered elliptical end of the outlet leg where it meets the central chamber.

FIG. 3 is s view of the applicant's diverter blade assembly 10 from the entry or inlet leg 22 end showing. The diverter blade 12 rotates on the axle 26 to a sealing posiiton in communication with the cooperatively shaped inwardly tapered interior walls at the elliptical shaped ends of the outlet legs 20 and 21 where they meet the central chamber 16. The angles allowed by applicant's device allow for a free flow of the material entering the inlet leg 22.

Figure 6:
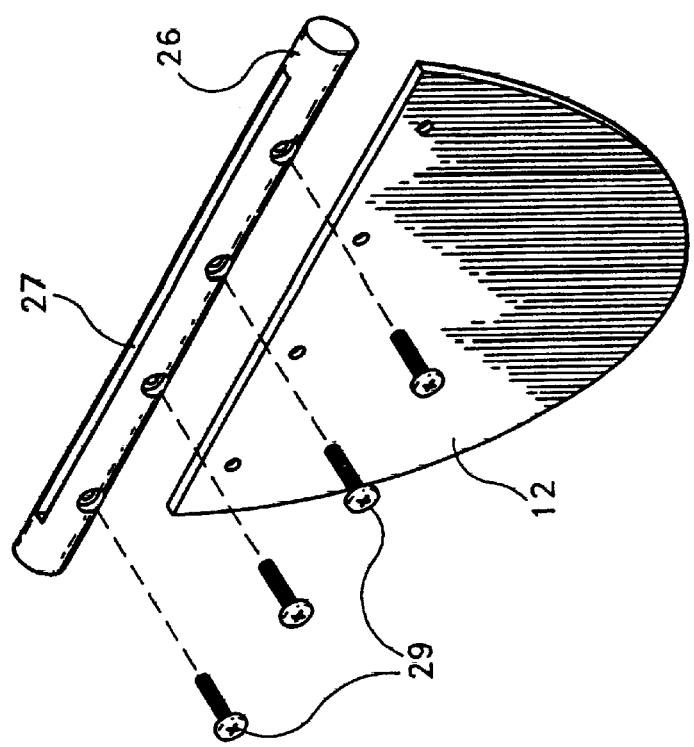
FIG. 6 is an exploded view of the diverter blade and axle featuring the access slot used for blade insertion into the valve center chamber.
Figure 5:
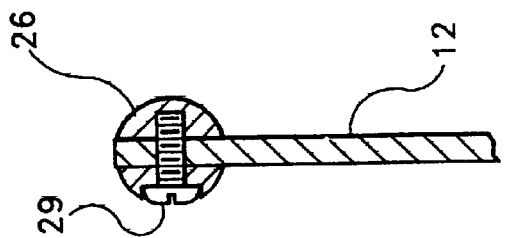
FIG. 5 is a side view at line 5—5 of the screw mounting of the diverter blade into the axle.
Figure 4:
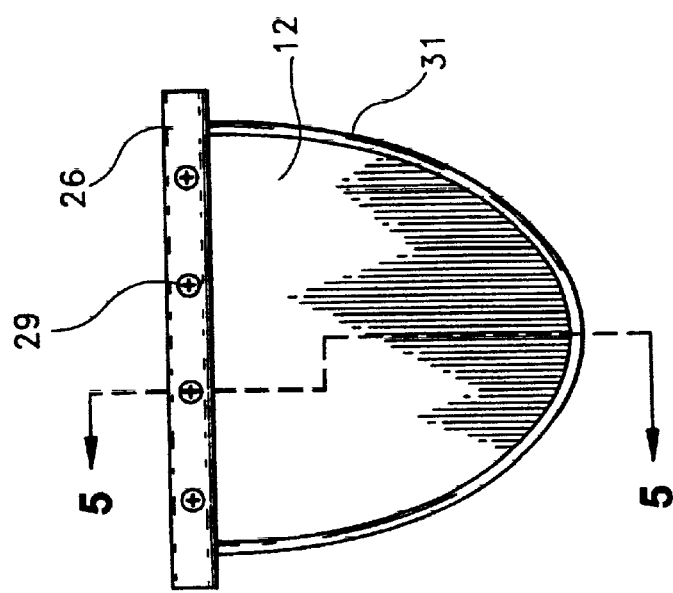
FIG. 4 is a frontal view of the diverter blade mounted at its base edge into the selectively rotatable axle.

FIGS. 4–6 show the assembly of the diverter blade 12 mounted at its base edge into a mounting slot 120 in the selectively rotatable axle 26. The mounting slot 120 is accessible from outside the assembly through an in line access slot 25 in the assembly body between the exit legs allowing communication with the interior central chamber 16 while mounted in the valve assembly 10 when rotated to proper posiiton. This allows for the insertion of the valve diverter blade 12 from outside the valve assembly through the in line access slot 25 and mounting slot 120 should replacement or other maintenance of the diverter blade 12 be necessary. An optional shaft closure seal 27 can be added to press fit or otherwise conventionally mount into the access slot 25 in the body if extra sealing of the device is desired. The blade access slot 25 is especially important since the side walls of the central chamber 16 taper outwardly to a point where the base edge of the eliptical diverter blade 12 is larger than the diameter of the inlet leg 22 or those of the outlet legs 21 & 23. Without the access slot 25 the diverter blade 12 cannot be inserted into the body of the valve 10 once constructed. Screws 29 or other conventional attaching devices such as rivets or pressed pins, maintain the diverter blade 12 in the mounting slot 120. This embodiment of the device also allows for the diverter blade 12 to be changed or maintained by removing it through the access slot 25 without disassembly of the entire apparatus.

As noted earlier the diverter valve assembly 10 is capable of fluid flow diversion in conventional air conditioning and forced air heating systems and grain elevators and other solid solution systems and is a vast improvement on conventionally used air flow diversion devices. Further, with modifications on the seals used the valve assembly 10 could be used to divert the flow of liquids. Axle seals could be added around the diverter blade 12 and at the point the axle 16 contacts the outside of the assembly to handle the added sealing requirements of pressurized gas or liquid fluid flows.

Figure 7:
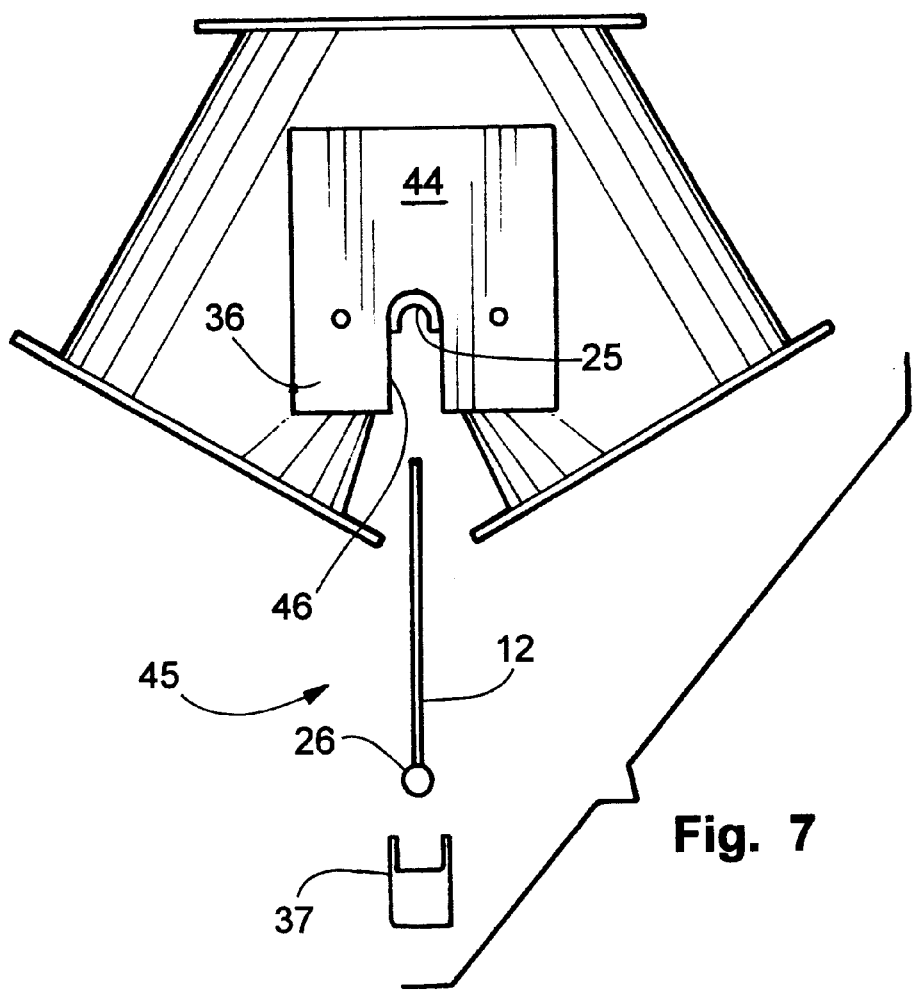
FIG. 7 is a side view of another embodiment the diverter valve apparatus showing the diverter valve and attached bearing ready for insertion into the access slot.
Figure 8:
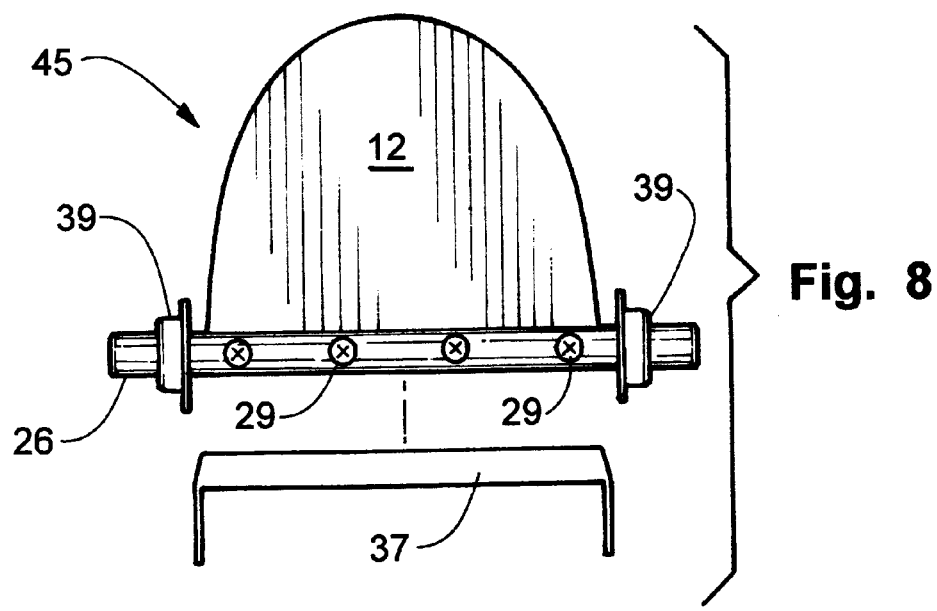
FIG. 8 is a side view of the diverter blade attached to the axle with bearing mounted thereon and the slot closer insert for sealing the slot.

FIG. 7 is an exploded view of another preferred embodiment of the device herein disclosed showing the diverter blade 12 and axle 26 assembled with a bearing 39 mounted upon the axle 26 ready for mounting. The diverter blade 12 is depicted as being mounted to the axle 26 using welds 33 however screws 29 could also be used to hold the diverter blade 12 to one edge of the axle 26 in the axle mounting slot 27. The entire assembly of diverter blade 12 and axle 26 and bearing 39 is then inserted into the device through the access slot 25. The bearings 39 are held in place by frictional fit with a longitudal slot 46 in mounting plate 44 which is mounted to the device outer wall. This allows for easy replacement of the entire assembly 45 by insertion through the access slot 25. The bearings 39 could also be mounted on the device 10 by enlarging both ends of the access slot 25 to accommodate them in a good fit. A shaft closure seal 37 is fitted in frictional engagement with the access slot 25.

While all of the fundamental characteristics and features of the aperture for alteration of the cross sectional area of an intake manifold or chamber invention have been shown and described, it should be understood that various substitutions, modifications, and variations may be made by those skilled in the art without departing from the spirit or scope of the invention. Consequently, all such modifications and variations are included within the scope of the invention as defined by the following claims.

What is claimed is:

1. A control valve for use in combination with a conduit having fluid flow therethrough for controlling the fluid flow therethrough comprising:

a housing for communicating with said conduit, said housing having a first path and a second path therethrough; each of said paths having an input end substantially elliptical in shape, and an output end, each of said paths having an interior wall surface, said interior wall surface defining the interior dimension of said paths;

an axle mounted in said housing, between said first and second paths, said axle selectively rotatable and having a first elongated slot therein;

a elongated access slot positioned in said housing in a position in line with said axle, said elongated access slow allowing access to said first elongated slot in said axle;

a diverter blade, said diverter blade substantially elliptical in shape, said diverter blade removably mountable in said first elongated slot in said axle through said access slot;

said input end of said first path and said input end of said second path having an inward taper toward the output ends of said paths;

said diverter blade selectively positionable between a point of contact with said interior wall surface at each of said input ends of said first path and said second path, by selective rotation of said axle; and, a seal formed by the contact of said diverter blade and said point of contact with said interior wall surface when said diverter blade is selectively positioned at either said input end of said first path, or, said input end of said second path, thereby allowing said fluid flow into one of said paths, while diverting said fluid flow at the input end of the path in which said diverter blade is positioned to form said seal.

2. The invention as defined in claim 1, wherein said diverter blade is insertable and removable through said elongated access slot whereby said diverter blade may be removed and remounted in said first elongated slot in said axle through said elongated access slot.

3. The invention as defined in claim 2 wherien said diverter blade is mounted in said elongated slot in said axle using screws.

4. The invention as defined in claim 1 further comprising said diverter blade having a seal attached to said diverter blade at said point of contact of said diverter blade with said interior wall surface.

5. The invention as defined in claim 1 wherein said fluid is a particulate.

6. The invention as defined in claim 1 wherein said fluid is compressed air.

7. The invention as defined in claim 1 further comprising an over centering biasing means communicating directional bias to said diverter blade for maintaining said diverter blade in a selected position in absence of fluid flow.

8. A control valve for use in combination with a conduit having fluid flow therethrough for controlling the fluid flow therethrough comprising:

a housing for communicating with said conduit, said housing having a first path and a second path therethrough; each of said paths having an input end substantially elliptical in shape, and an output end, each of said paths having an interior wall surface, said interior wall surface defining the interior dimensions of said paths;

an elongated access slot positioned in said housing between said first and second paths therethrough;

an axle assembly consisting of an axle having two ends, said axle having a diverter blade substantially elliptical in shape attached thereto, said axle having a bearing attached at both ends;

said elongated access slot dimensioned to accommodate the insertion therethrough of said axle with said diverter blade attached;

a pair of mounting plates positioned upon the exterior of said housing, said mounting plates having an elongated slot therein positioned and sized to frictionally engage said bearings thereby providing a mount for said bearings for rotation of said axle therein;

said input end of said first path and said input end of said second path having an inward taper toward the output ends of said paths;

said diverter blade selectively positionable by said rotating of said axle between a point of contact with said interior wall surface at each of said input ends of said first path and said second path; and a seal formed by the contact of said diverter blade and said point of contact with said interior wall surface when said diverter blade is selectively positioned at either said input end of said first path, or, said input end of said second path, thereby allowing said fluid flow into one of said paths, while terminating said fluid flow at the input end of the path in which said diverter blade is positioned to form said seal.

9. The invention as defined in claim 8 further comprising a seal, said seal frictionally engageable with said access slot.

* * * * *